B. T. O'BRIEN & W. H. BROWNING.
MACHINE FOR CALCULATING.
APPLICATION FILED JAN. 31, 1905.

975,634.

Patented Nov. 15, 1910.
12 SHEETS—SHEET 1.

WITNESSES.
E. Howard
Joseph Bates.

INVENTORS.
B. T. O'Brien
W. H. Browning
by T. Howard O'Brien
atty.

B. T. O'BRIEN & W. H. BROWNING.
MACHINE FOR CALCULATING.
APPLICATION FILED JAN. 31, 1905.
975,634.
Patented Nov. 15, 1910.
12 SHEETS—SHEET 4.
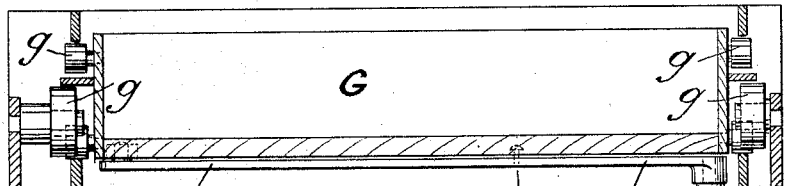
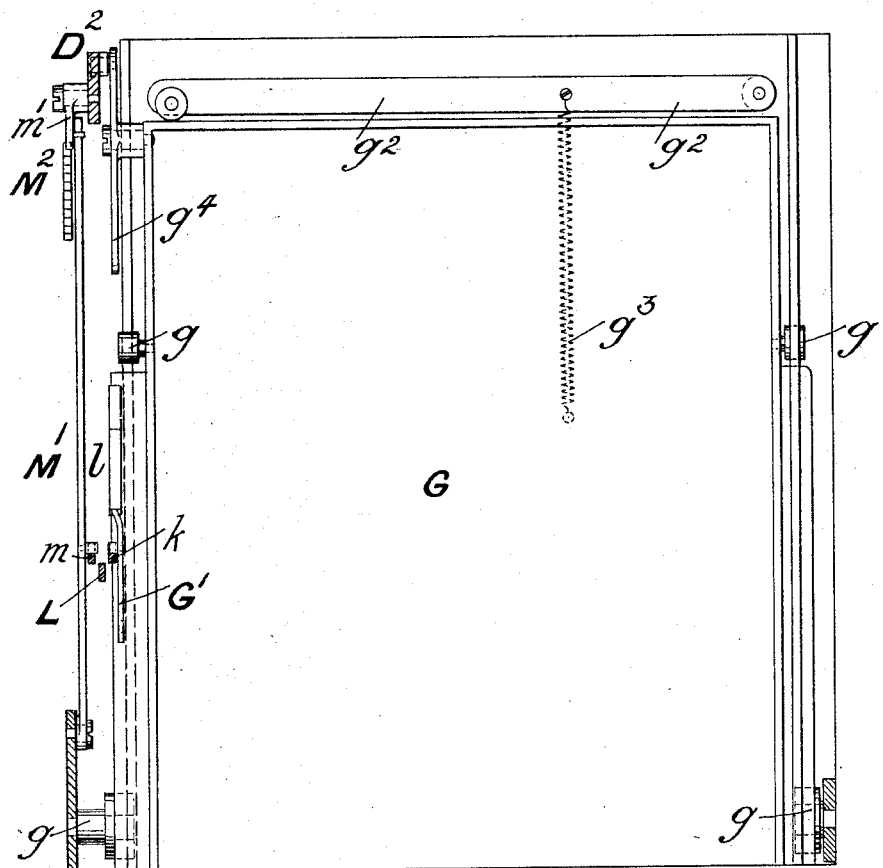

B. T. O'BRIEN & W. H. BROWNING.
MACHINE FOR CALCULATING.
APPLICATION FILED JAN. 31, 1905.

975,634.

Patented Nov. 15, 1910.
12 SHEETS—SHEET 5.

WITNESSES.

INVENTORS.

B. T. O'BRIEN & W. H. BROWNING.
MACHINE FOR CALCULATING.
APPLICATION FILED JAN. 31, 1905.

975,634.

Patented Nov. 15, 1910.
12 SHEETS—SHEET 6.

WITNESSES.
E. Howard
Joseph Bates

INVENTORS.
B. T. O'Brien
W. H. Browning

B. T. O'BRIEN & W. H. BROWNING.
MACHINE FOR CALCULATING.
APPLICATION FILED JAN. 31, 1905.
975,634.
Patented Nov. 15, 1910.
12 SHEETS—SHEET 7.
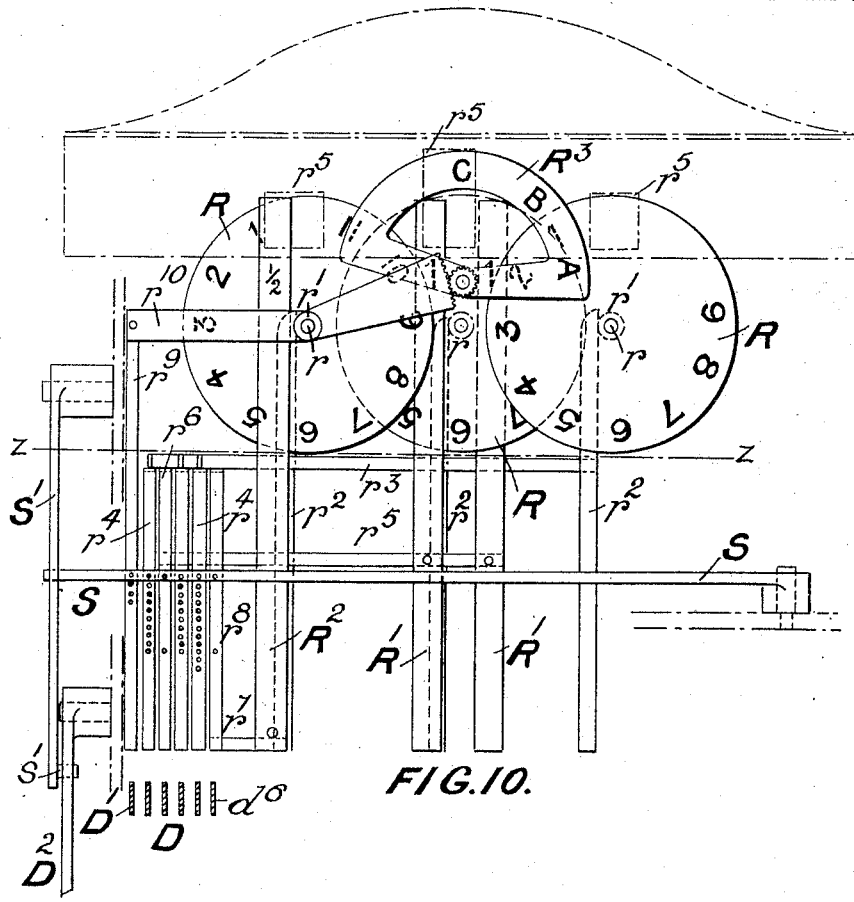
FIG.10.
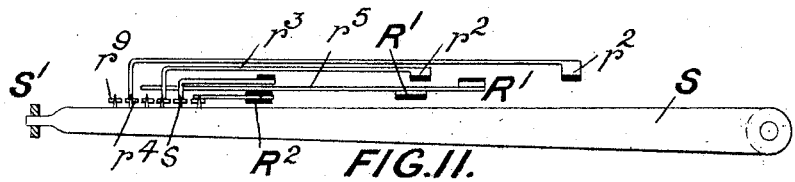
FIG.11.
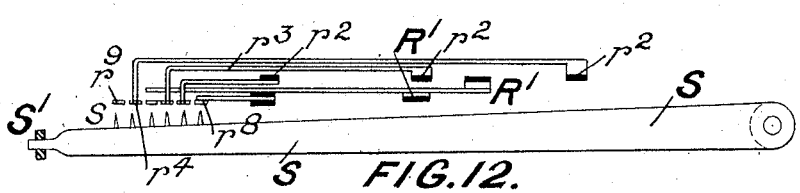
FIG.12.
WITNESSES.
E. Howard
Joseph Bates
FIG.13.
INVENTORS.
B. T. O'Brien
W. H. Browning
by Dowden O'Brien
Atty
THE NORRIS PETERS CO., WASHINGTON, D. C.

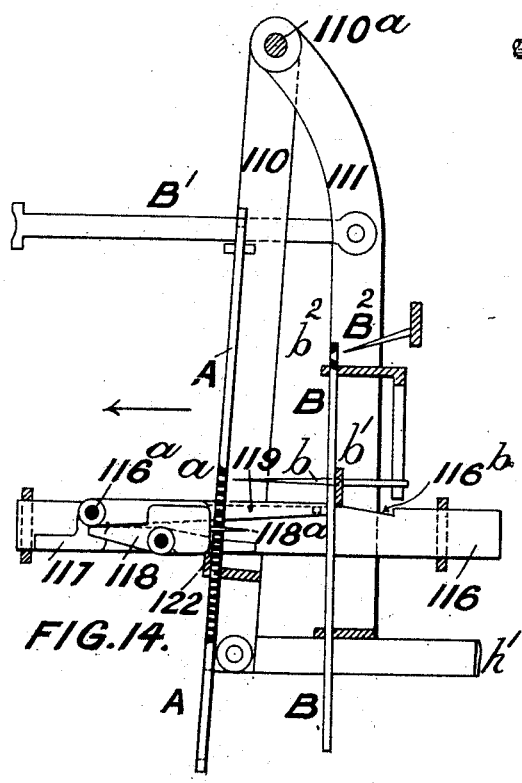
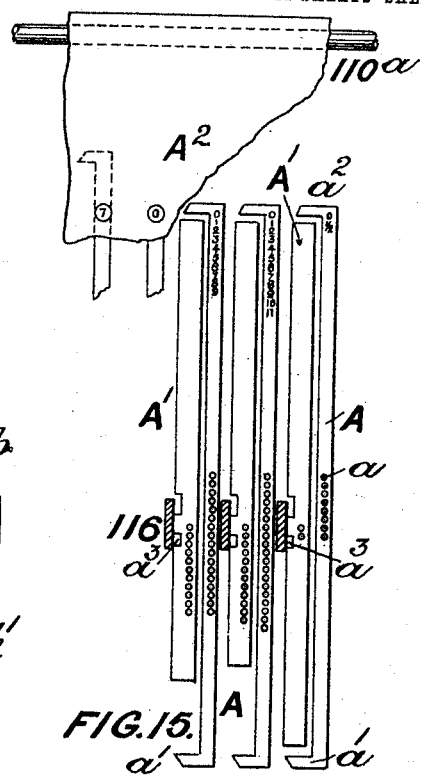
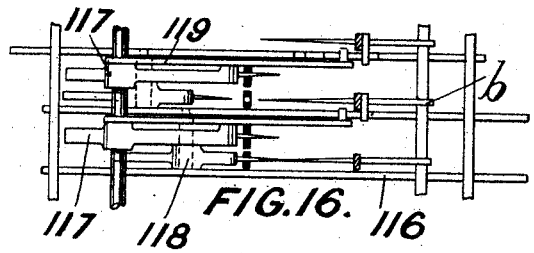
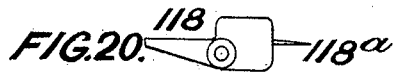
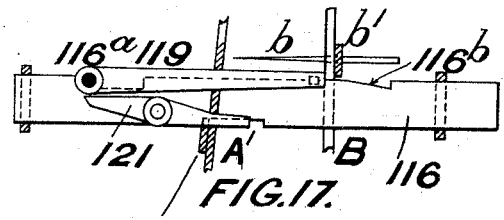
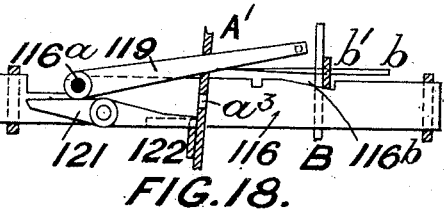

B. T. O'BRIEN & W. H. BROWNING.
MACHINE FOR CALCULATING.
APPLICATION FILED JAN. 31, 1905.

975,634.

Patented Nov. 15, 1910.
12 SHEETS—SHEET 9.

WITNESSES.
E. Howard.
Joseph Bates.

INVENTORS.
B. T. O'Brien
W. H. Browning

UNITED STATES PATENT OFFICE.

BENJAMIN THOMPSON O'BRIEN AND WALTER HENRY BROWNING, OF LIVERPOOL, ENGLAND; SAID BROWNING ASSIGNOR TO SAID O'BRIEN.

MACHINE FOR CALCULATING.

975,634.  Specification of Letters Patent.  Patented Nov. 15, 1910.

Application filed January 31, 1905. Serial No. 243,580.

*To all whom it may concern:*

Be it known that we, BENJAMIN THOMPSON O'BRIEN and WALTER HENRY BROWNING, British subjects, and residents both of Liverpool, in the county of Lancaster, England, have invented certain new and useful Improvements in Machines for Calculating, of which the following is a specification.

This invention relates to improvements in apparatus for adding or counting without the use of rotating wheels, and may be employed in conjunction with a cash drawer or otherwise as a cash registering apparatus or it may be employed simply as an adding machine either with or without registering or recording apparatus.

It will be fully described with reference to the accompanying drawings.

Figure 1:
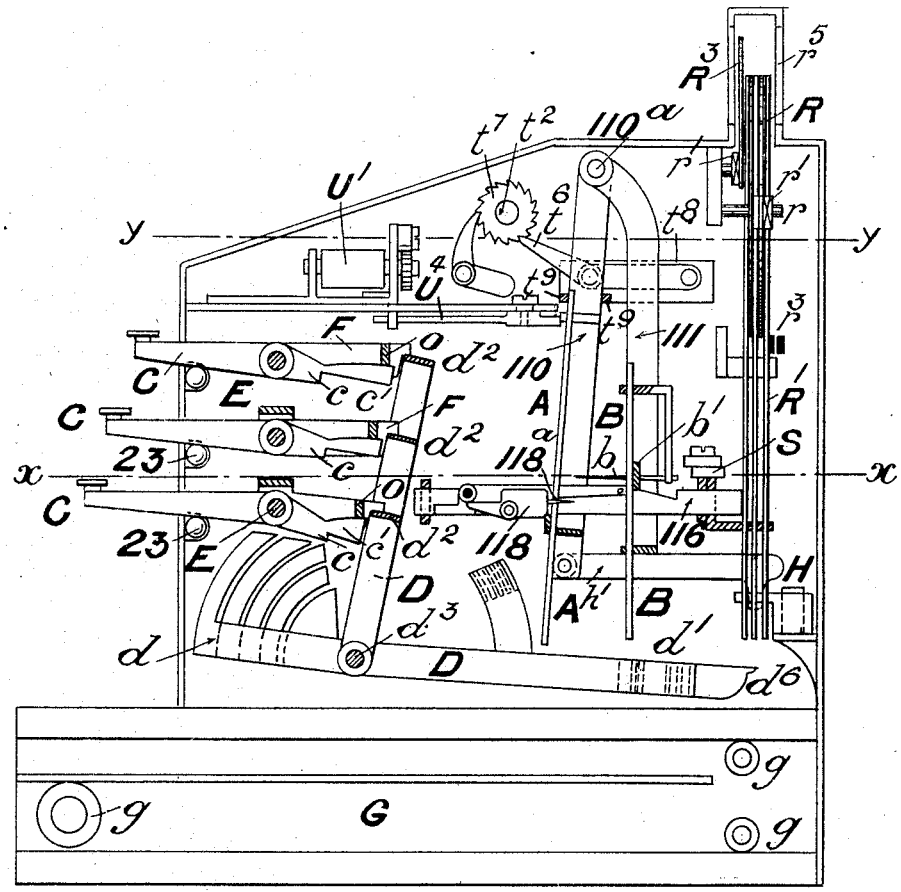
Figure 2:
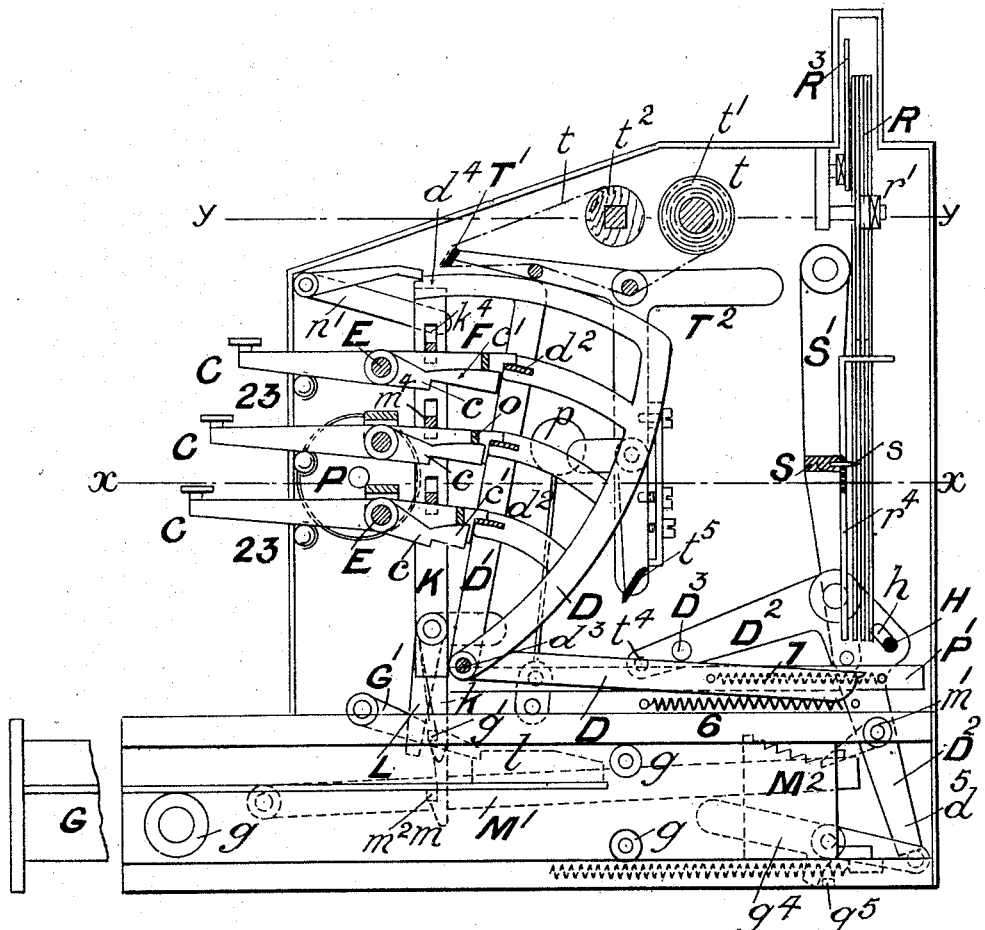
Figure 3:
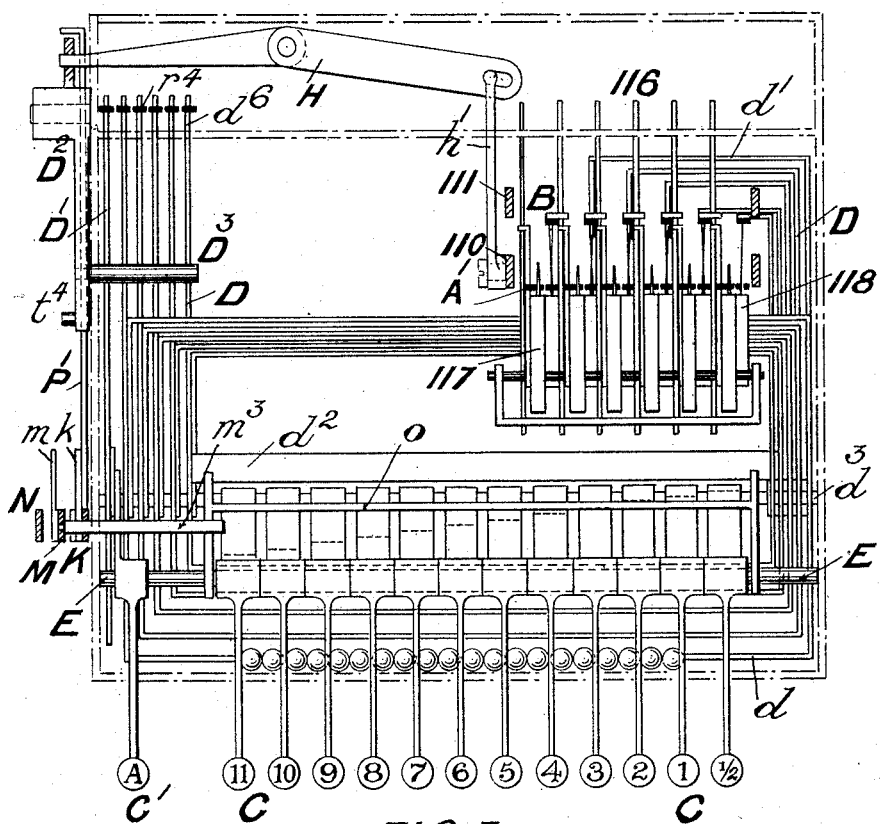
Figure 6:
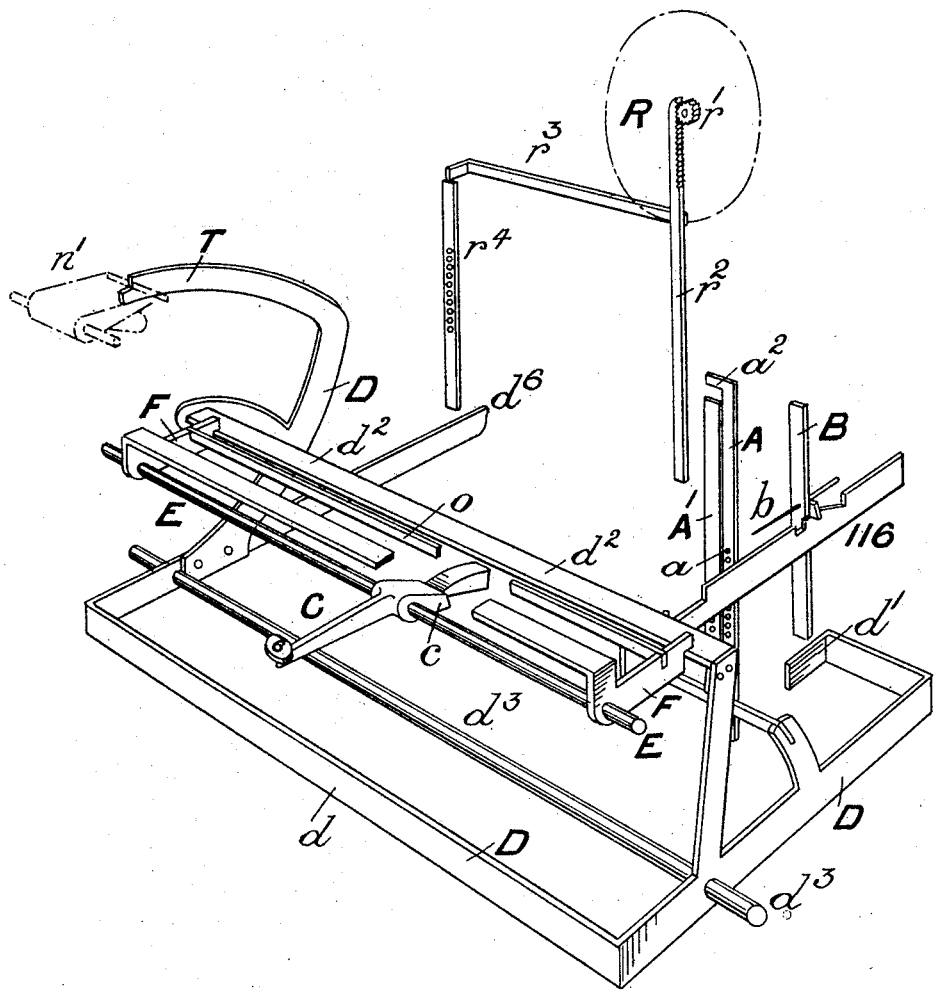
Figure 7:
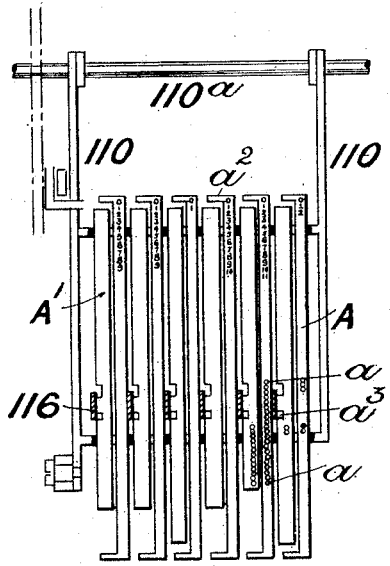
Figure 8:
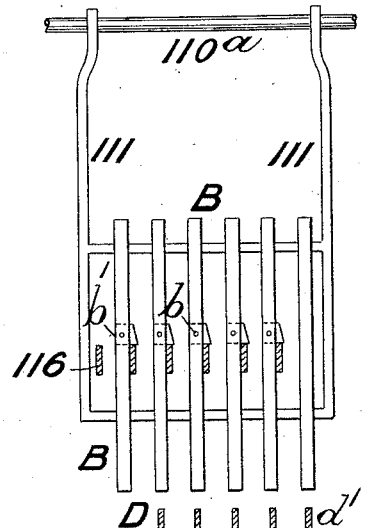
Figure 9:
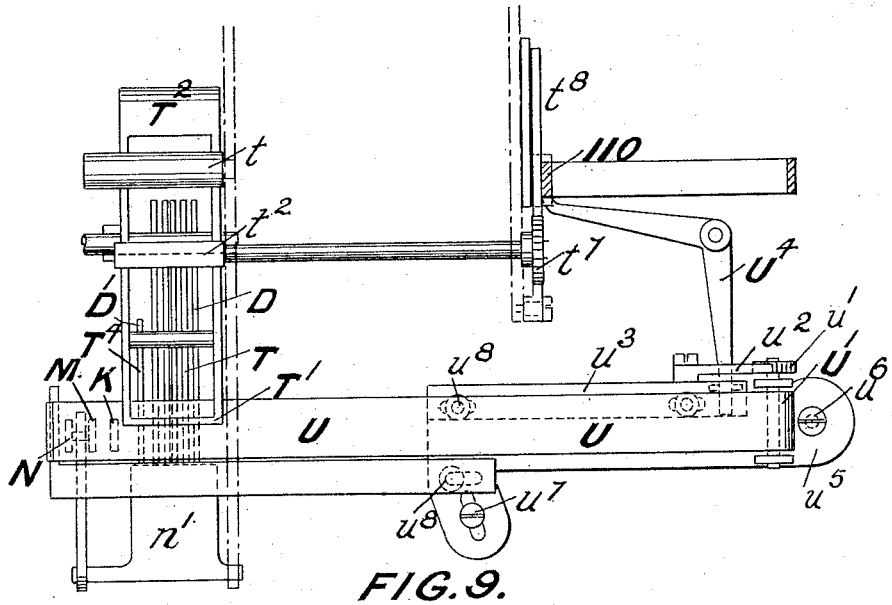
Figure 21:
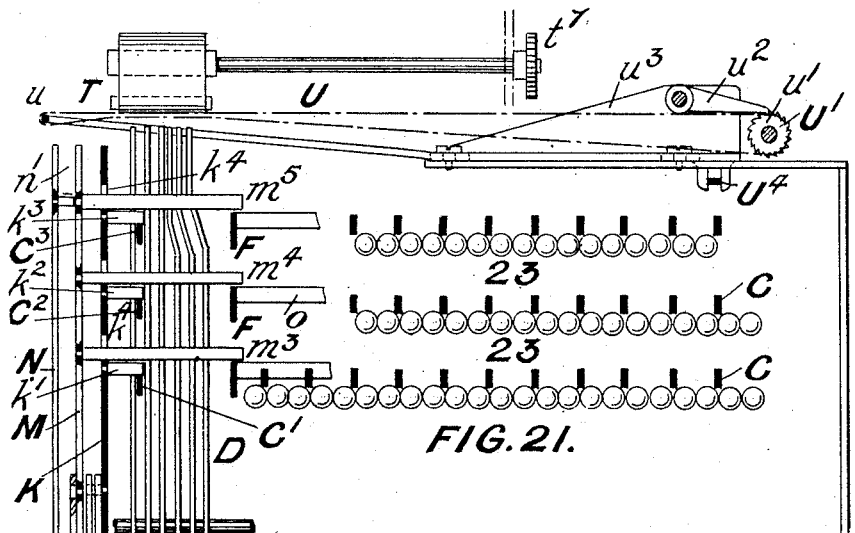
Figure 22:
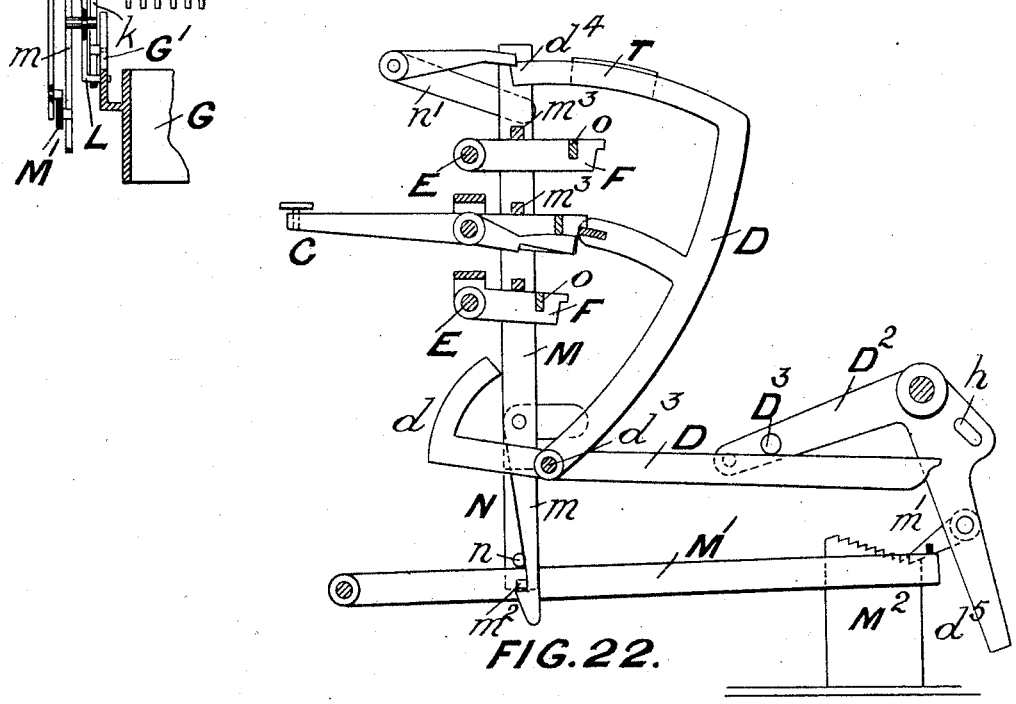
Figure 23:
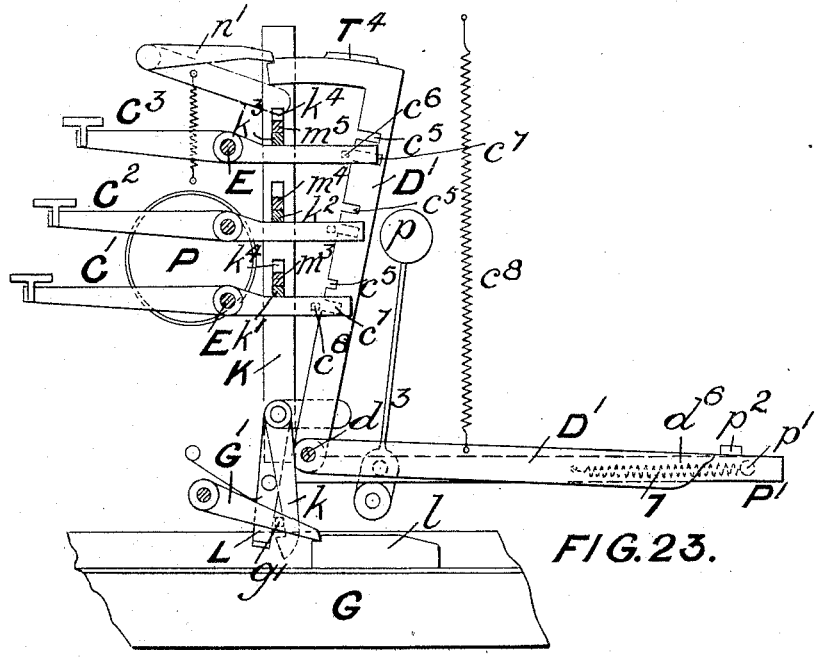
Figure 24:
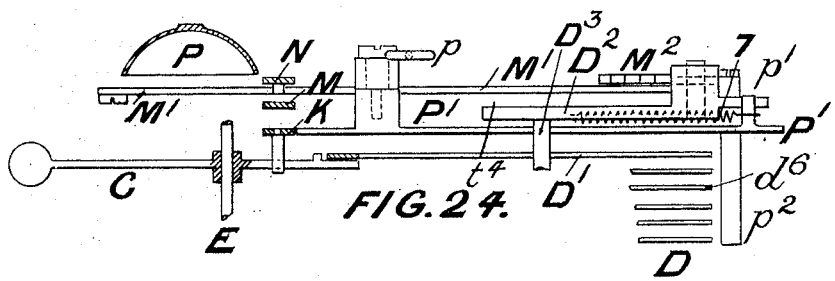
Figure 25:
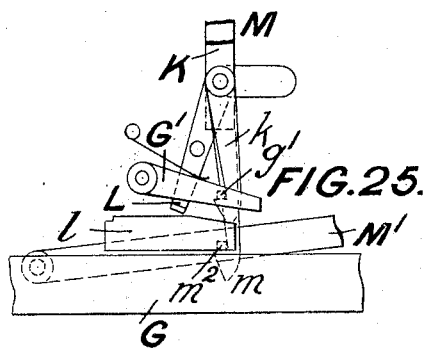
Figure 26:
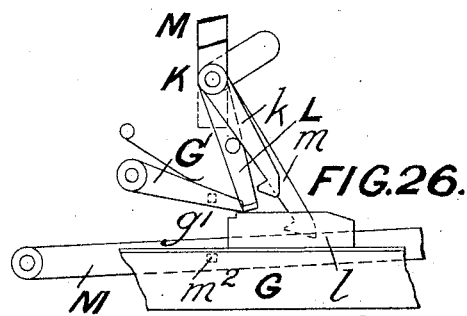
Figure 27:
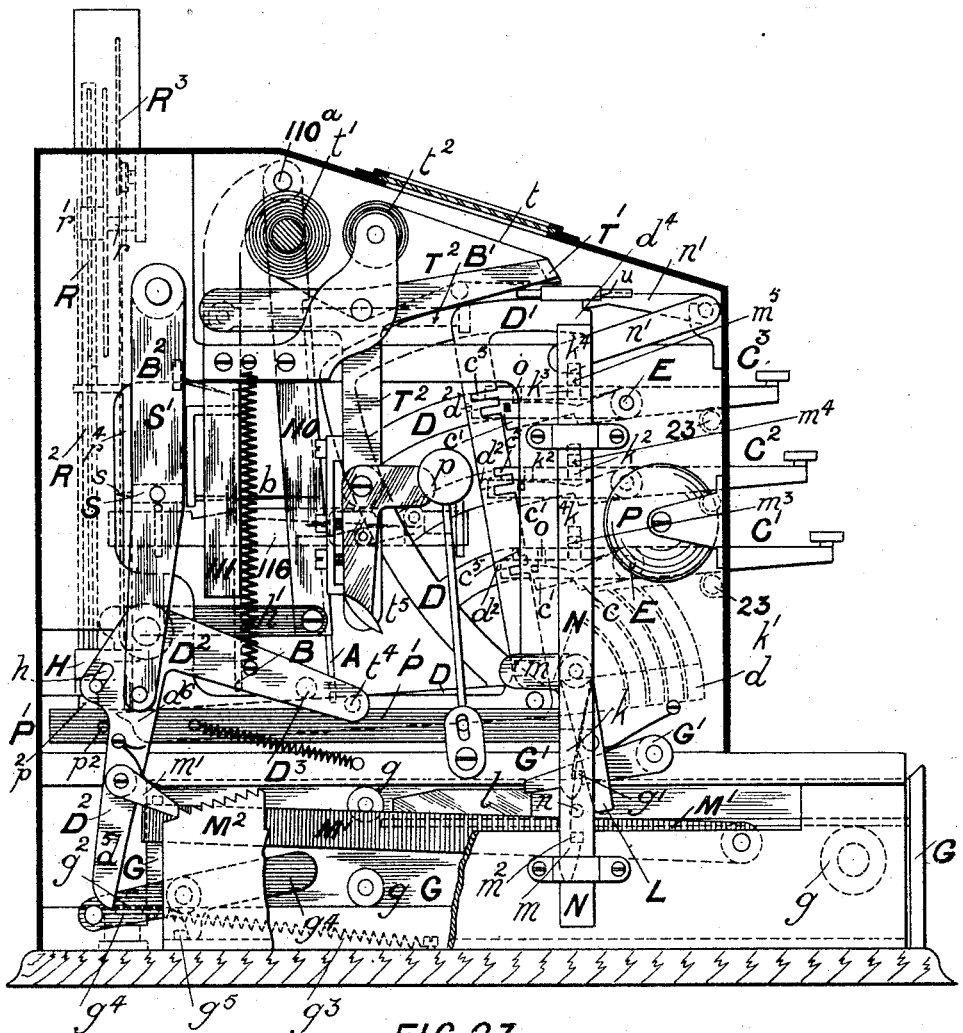
Figure 28:
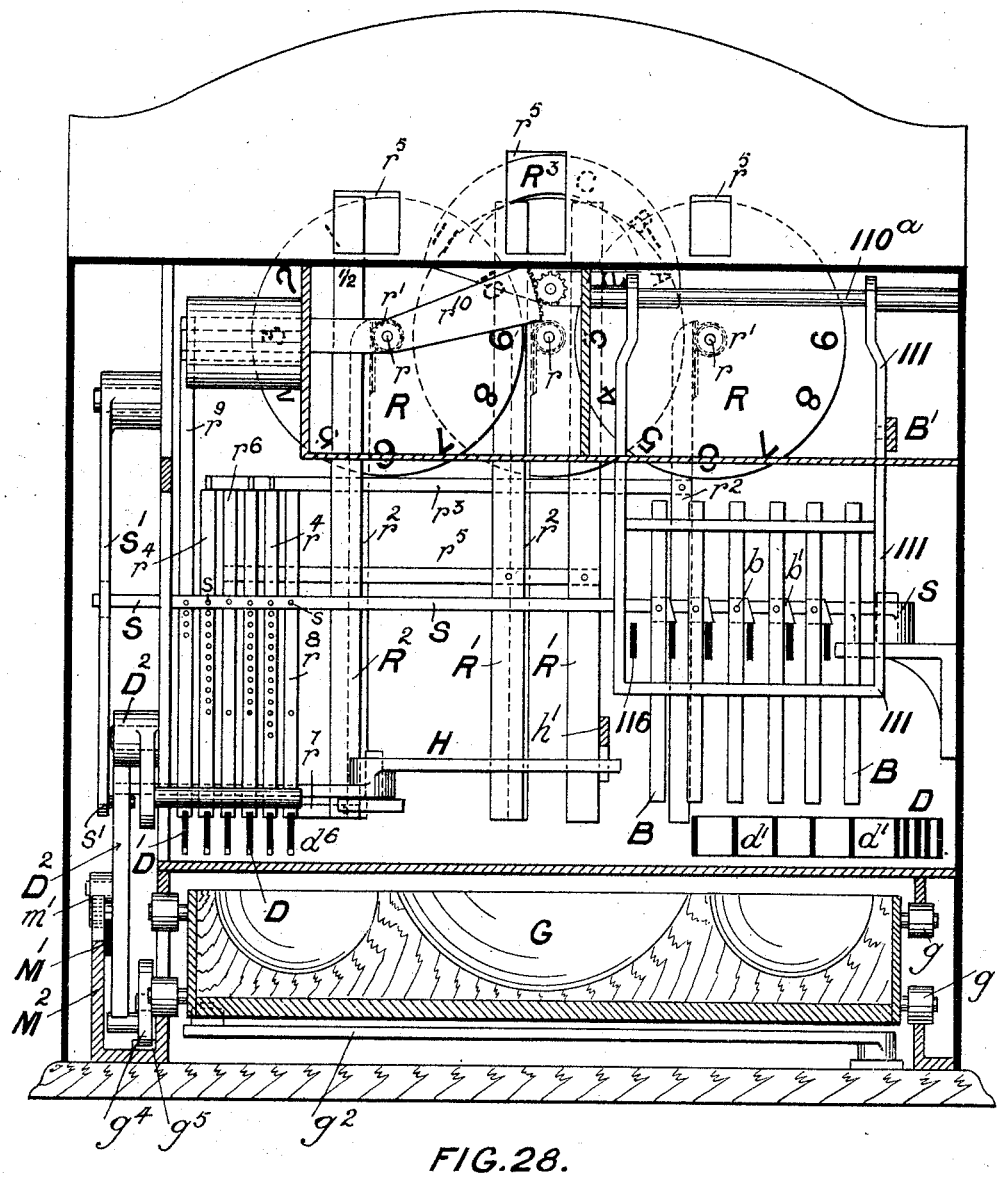

Figure 1. side elevation partly in section of machine applied as a cash register showing keys and levers. Fig. 2. side elevation partly in section of parts beyond showing drawer mechanism printing device and bell. Fig. 3. sectional plan of levers and counting mechanism taken through line x—x Figs. 1 and 2 of first bank or pence row of keys. Fig. 4. plan of cash drawer. Fig. 5. sectional elevation of cash drawer. Fig. 6. perspective view showing one key and corresponding set of levers. Fig. 7. front elevation of counting plates. Fig. 8. front elevation of lifting crossheads. Fig. 9. plan of ends of levers carrying type ribbon and paper feed on line y—y Figs. 1 and 2. Fig. 10. front elevation of indicators showing connection with drawer mechanism also lifting racks and locking connections. Fig. 11. sectional plan showing indicators locked on line z—z Fig. 10. Fig. 12. sectional plan showing indicators unlocked. Fig. 13. sectional plan of indicator through centers. Fig. 14. side elevation enlarged of one set of counting plates. Fig. 15. front elevation of counting plates showing half-pence pence and shilling plates. Fig. 16. plan in detail of counting mechanism showing one bolt set for carrying on. Fig. 17. side elevation in detail of sliding bolt locking lever for same and push lever. Fig. 18. side elevation of sliding bolt showing locking lever taken up by means of counting plate. Bolt is here shown as pushed back by means of the counting plate engaging with push lever. Cross-head of next denomination is shown ready to be raised by cam of sliding bolt. Fig. 19. fixed pin, lever engaging with second counting plate. Fig. 20. movable pin lever connected to sliding bolt and moved with same. Fig. 21. front elevation showing keys and ball lock and means of unlocking drawer and levers from keys. Fig. 22. side elevation of sliding rod showing pins engaging lever locks and means of unlocking lever, and resetting lever. Fig. 23. side elevation of initial lever, sliding rod, bell action and drawer lock. Fig. 24. plan of same partly in section. Fig. 25. detail section of drawer lock and hook motion showing drawer partially open. Fig. 26. detail section of drawer lock and hook motion showing drawer nearly closed and drawer lock ready to drop in. Fig. 27. side elevation of the machine partly in section showing the reverse side to that shown in Fig. 2. Fig. 28. front elevation partly in section with the front part and keys removed.

The counting is effected by a number of counting plates A and A' which are mounted to slide vertically the plates A being raised a given distance for each unit and allowed to fall when 10, 12 or other desired number of units have been added and the plates A' being raised one unit to represent tens, hundreds, pounds or other denominations.

In its simplest form the machine is constructed with sliding plates to represent tens, hundreds, thousands, and so on or it may with slight modification or arrangement be constructed so that the plates represent pence, shillings, pounds, dollars, marks, francs, or other denomination of money or weights. In whichever form it is constructed the sliding plates are all constructed and operated in a similar manner so that in describing the machine it is only necessary to describe the action of one or two plates the succeeding ones to any extent being merely reproductions thereof differing only according to the denomination which they are intended to represent, one set is shown detached in Fig. 6.

Each counting plate A is provided with a number of holes $a$ and is raised by a cross head B, provided with lifting pins $b$ which enter the holes $a$ by means of a lever D operated or controlled by a key C of which there is one for each unit or value in each denomination. The depressing of the key liberates the lever D which at its forward end *d* falls down operated by the action of a weight or spring and the back end *d'* is raised a corresponding distance and elevates the cross head B. The movement of the lever D is checked by the cross bar $d^2$ of the lever engaging the shoulder *c* on the under side of the key.

The counting plates A are mounted to slide vertically or approximately vertically in a swinging frame 110 pivoted on a fixed shaft $110^a$ in front of the frame 111, which is also pivoted on shaft $110^a$ and in the frame 111 the cross heads B slide vertically. The operating frame D is pivoted on any stationary part of the framework of the machine and the keys C are pivoted on rods E.

The keys C are placed horizontally across the machine on the rods E and over the rear ends *c'* of the keys is placed a rod *o* attached at its ends to two locking levers F also pivoted on the rod E which engage the cross bar $d^2$ of the lever D and hold it in normal position. On any one of the keys C being depressed the rear end *c'* raises the locking levers F and releases the lever D to lift the cross head B. The ends of the keys C are each formed with a shoulder *c* on the under side each at a different length from the end equivalent to the value of the key so that the cross bar $d^2$ falls forward a different distance according to the value of the key depressed and correspondingly raises the cross head B and counting plate A a different distance. When one key C is depressed and the lever D released the cross bar $d^2$ falls forward under the one depressed key but over the ends of all the other keys; this action has the effect of locking all the remaining keys in the same line and preventing them being operated as the forward end cannot be depressed while the bar $d^2$ is over the rear end *c'*. The depressed key cannot be returned to normal position or operated again until the lever D has been returned to normal position. To further insure the locking of the keys the well known ball locking action may be employed the balls 23 being set in a slotted tube with only room between them for one key at the same time.

Between each set of counting plates A A' mounted upon part of the frame work a sliding bolt 116 is fitted to slide to and fro independently of the plate (see Figs. 14 to 18). Each sliding bolt carries pivoted to it a lever 118 with a forwardly projecting pin $118^a$ and a pivoted push lever 121 which passes through a notch $a^3$ in the counting plate A'. On a cross shaft $116^a$ of the fixed frame of the sliding bolts a pin lever 117 and a locking lever 119 are pivoted, the latter passing through a notch in the counting plate A'. Each cross head B is provided with a lateral projection *b'* which also rests upon the sliding bolt 116, the upper surface of which is notched as shown. At or near the upper end of the counting plate A numerals 0 to 10 or to 12 are inscribed which are exhibited through an aperture or slot or otherwise to indicate the number or amount that has been registered.

The counting plates A and A' are in the normal position shown in Fig. 14, before the machine is operated and before any key is operated the frame 110 is pressed or swung back causing the zero holes *a* therein to pass back over the pin *b* of the cross head B. The striking of a key C and the operation of the lever D raises the cross head B and pin *b* the equivalent height and with them the counting plate A. The counting plate A is provided with two lugs *a'* $a^2$ and the supplementary counting plate A' is placed within these lugs and the bottom lug *a'* is adjusted to engage the plate A' and lift it when a number of holes equivalent to one hole less than the dividing number of such denomination shall have been reached. That is to say in the pence when eleven holes *a* have been raised and in decimals when nine holes have been raised and so on. The top lug $a^2$ of the plate A is always adjusted the distance of one hole *a* above the top of subsidiary plate A'.

The sliding bolt 116 in its normal position is locked by a pin on the locking lever 119 engaging a notch on the top edge of the sliding bolt 116. On the return stroke of the swinging frame 110 the counting plate A is carried with one of its holes *a* onto the pin of the pivoted lever 118 before it leaves the pin of the cross head B and one of the holes of the subsidiary plate A' is carried onto the pin of the lever 117 and the plates A A' are held in these relative positions while the cross head B is permitted to drop back to its zero position. During the operation of this movement the end of the push lever 121 passes through the notch inside of the plate A' and the locking lever 119 passes through the other notch in plate A'. On the plate A being raised by the pin of the cross head B above 11 or 9 as the case may be the projecting lug *a'* of the plate A engages the bottom of the plate A' and the two will be lifted together. The plate A' previous to being lifted by lug *a'* of the plate A, has, by means of a second notch been moving to and fro over the end of the push lever 121 mounted on the sliding bolt 116. On the plate A' being lifted the second notch is carried above the end of the push lever 121, and therefore when sliding bolt 116 is unlocked, it is carried forward by the swinging frame 110 to the position shown in Figs. 16 and 18. The unlocking of the bolt 116 is effected by the raising of the locking lever 119 out of the notch by the plate A'. The pin lever 118 pivoted to sliding bolt 116 will be locked in position, by the locking lever 119, to receive the counting plate A so long as counting plate A shall not come into contact with the bottom of the counting plate A', but such contact being made (the locking lever 119 being taken out of the notch in the sliding bolt 116, and the second notch of the plate A' being lifted above the end of the push lever 121,) pin lever 118 being attached to the slide bolt 116 will be carried forward along with the bolt 116. Therefore the counting plate A, (which has hitherto been received and held in position by the pin lever 118), will be free to fall until stopped by coming in contact with the top end of the counting plate A'. On the next return stroke of the swinging frame the subsidiary plate A' comes in contact with the end of the push lever 121 and carries the sliding bolt 116 along with the swinging frame 110 to the position shown in Figs. 16 and 18. The pin lever 118 will be in a position for the pin thereon to receive the plate A until the projecting lug $a'$ shall raise the plate A', but being pivoted to the sliding bolt 116 the pin 118 will be carried back free of the counting plate A and the plate will be free to fall when it leaves the end of the pin on the cross head B. The plate A then falls until the top projecting lug $a^2$ rests upon the top of the counting plate A'. The distance the plate A falls will be 12 for pence or 10 for decimals.

The projecting lug $b'$ of any one cross head B rests upon the adjacent sliding bolt 116 of the denomination lower in value. That is to say the lug $b'$ of the shillings cross head rests upon the sliding bolt of the pence; or the lug $b'$ of the tens denomination rests upon the sliding bolt 116 of the units and the hundreds on the tens and so on.

When the sliding bolt 116 is in the locked position shown in Figs. 1, 14, 16 and 17 the projecting lug $b'$ sets the pin $b$ of the cross head B in its normal or zero position in relation to any of the keys C that have been depressed. When however the sliding bolt 116 is moved forward by the plate A' into the position shown in Figs. 16 and 18 the inclined depression 116$^b$, therein will permit the projecting lug $b'$ of the cross head B of the next higher value to drop or fall to the bottom of the depression 116$^b$, which is equal in depth to one hole $a$ of the plate A. This therefore, permits the cross head B and pin $b$ to drop one hole below zero and consequently carries up the plate the distance of one hole higher at the next depression of the key thereby carrying one unit on from one denomination to the next. On any of the keys C being now depressed all the sliding bolts 116 which have been moved forward, are carried back to normal position by a cross bar 122 attached to the swinging frame 110. As the sliding bolts return to position the inclined depression or cam 116$^b$ raises any of the cross heads which may be below zero the distance of one of the holes $a$. This return action carries the counting plate A' off the pin or lever 117, the plate drops to its zero position and the locking lever 119 falls again into the notch in the sliding bolt 116.

At zero position of the counting plate A the number of holes $a$ into which the cross head pin $b$ will enter below the top hole must be one greater than the value of the highest key, thus for pence denomination 12 holes $a$ are required and for units 10 holes $a$ are required. A similar number of holes on the plate A are required to receive the pin of the lever 118 but the holes for the pin 118$^a$ may coincide with the holes $a$ or there may be sufficient extra holes as shown to accommodate both pins. In the supplementary counting plate A' there are a similar number of holes to receive the pin or lever 117. The object of providing one hole more than the value of the highest key is that there shall always be a hole for the pin $b$ of the cross head B to enter. For instance if the 9 key of the shillings denomination and the 11 key of the pence denomination be both depressed, (upon a key dividing on 12 for shillings) and the 2 key of the pence denomination be next depressed it will cause the lug $b'$ of the cross head of the shillings denomination to fall into the cam recess 116$^b$ of the sliding bolt 116 of the pence denomination and the pin $b$ of the cross head B of the shillings denomination will next move into the additional hole $a$ of the plate A of the shilling denomination. After the counting plate A has been raised 11 holes the lug $a'$ thereof will be directly under and in contact with the plate A' and should any further key say 2, of the same denomination be depressed the plate A' will be lifted an equivalent distance or number of holes. The 11 key has been depressed, the crosshead B by means of its pin $b$ has carried the counting plate A the distance of 11 holes bringing the projecting lug $a'$ of the plate A immediately under and ready to lift the plate A'. The swinging frame 110 carries the counting plate A off the cross-head pin $b$ on to the pin 118 of the pin lever 118$^a$. When the counting plate A is free from the pin $b$ of the crosshead B the crosshead B is at liberty to follow the resetting of the levers D and resume its zero or normal position. The swinging frame when receding places the 12th hole of the counting plate A on the pin $b$ of the crosshead B. The counting plate A is now in contact, by means of its projecting lug $a'$, with the supplementary counting plate A' and it will be readily understood that further motion given to the crosshead B will lift both the counting plates A and A' to the value of the key depressed. It is the crosshead B which is lifted by the lever D acted on by the keys C.

To return all the counting plates A and A' to zero after recording the totals the frame 111 and the cross heads B with it are pushed back by a push lever or link B' until all the cross head pins $b$ and the plates A and A' are clear of the pins or levers 118 and 117. To prevent the cross heads B falling into the cam recesses $116^b$ when this movement takes place a pin $B^2$ is fixed to the frame over each cross head B which enters a hole $b^2$ in the cross head and prevents it dropping until the frame 111 is returned to normal position.

To read the total of the amount registered at any given time the numerals on the top of the plates A are spaced the same as the holes $a$ and equivalent to the lift of the levers D and they are exposed through the apertures in a plate or cover $A^2$ attached to the swinging frame 110. The tail members of the levers D are all carried back to zero by a resetting lever $D^2$ with a bar $D^3$ resting on the levers D the resetting lever $D^2$ being operated by a hand lever or in the case of a cash register by the movement of the cash drawer.

For cash registering the machine is mounted over a cash drawer G as shown in Fig. 2. The drawer G is mounted on runners $g$, and at one side of the frame a pawl G' is pivoted to hold the drawer closed and at the back of the drawer a lever $g^2$ is pivoted with a spring $g^3$ by which the cash drawer G is pressed open when the pawl G' is released. On the side of the drawer G a tumbling lever $g^4$ is pivoted to engage the lower end $d^5$ of the resetting lever $D^2$ and cause it to reset the levers D to their first or zero position. The lever $g^4$ is tilted over by a stop $g^5$ against which it strikes and the end travels down the end $d^5$ of the resetting lever $D^2$ until it reaches the position shown in Fig. 2 and a pawl $m'$ engaging in a stationary rack $M^2$ prevents the return of the resetting lever until the lever M' and the pawl $m'$ are lifted.

At the back of the machine a lever H is pivoted (see Fig. 3.) one end of which engages a slot $h$ in the resetting lever $D^2$ and the other end is connected by a link $h'$ to the swinging frame 110 previously described. The operation of the resetting lever $D^2$ to reset all the levers D also operates the swinging frame 110 to remove the counting plates A from the pins $b$ of the cross heads B, and place them and the subsidiary plates A' on pins on the levers 118 and 117 into the position shown in Fig. 14. The reverse movement of the resetting lever $D^2$ when released by the lever M' raising the pawl $m'$ removes the plates A and A' from the pins or levers 118 and 117 and places the plates A onto the pins $b$ of the cross head B. The pawl G' which engages the side of and locks the drawer G is provided with lug or pin $g'$.

At one side of the machine and at the side of the drawer G and pawl G' three vertically sliding or lifting rods K, M and N are placed, (see Figs. 21 to 26). The lifting rod K has a hook $k$ pivoted at its lower end which falls below the pin $g'$ on the pawl G' and when the lifting rod is raised the pawl G' is lifted with it and the drawer G released.

The lifting rod M (see Fig. 22) has a hook $m$ pivoted at its lower end and beside the rod M and hook $m$ is placed a lever M' which extends along the side of the machine to the resetting lever $D^2$ on which a pawl $m'$ hangs. The pawl $m'$ engages a fixed or stationary rack $M^2$ and forms a lock to hold the resetting lever $D^2$ and the operating levers D by the bar $D^3$. On the transverse lever M' is a pin or projection $m^2$ with which when the lifting lever M is raised the hook $m$ engages and lifts the lever to release the pawl $m'$ and resetting lever $D^2$.

The lifting rod N see Figs. 21 and 22 is provided with a pin $n$ which rests upon the lever M' by which it is lifted when the lifting rod N and lever M' are raised. The top end of the lifting rod N engages a locking pawl $n'$ and the pawl $n'$ engages a notch $d^4$ in the top end of an upright arm of the lever D. The pawl $n'$ also engages a notch in the top of the lever D' (hereinafter described, see Fig. 23). The object of the locking pawl $n'$ is to relieve the strain of the various springs and weights which would otherwise entirely fall upon the pawl $m'$ and rack $M^2$ and cause an undue strain upon the keys C, C', $C^2$, $C^3$ in operating the machine. The locking pawl $n'$ falls into the notches of the levers D and D' when the resetting lever $D^2$ has fully reset all the levers D.

In addition to the keys C by which the counting or adding mechanism of the machine is operated at the side of the machine one two or more keys C', $C^2$, $C^3$ are placed called initial keys which are employed to release the cash drawer G and other parts of the mechanism. The keys C' $C^2$ $C^3$ which are termed initial keys are marked with different distinguishing initial letters and are mounted on the rods E which carry the other keys C.

On the lifting rod K near the top one or more laterally projecting pins $k'$ $k^2$ $k^3$ are fitted which rest on the initial keys C' $C^2$ $C^3$ and above the pins $k'$ $k^2$ $k^3$ slots $k^4$ are cut through which project pins $m^3$ $m^4$ and $m^5$ affixed to the lifting rod M. The pins $m^3$ $m^4$ $m^5$ rest upon the pins $k'$ $k^2$ $k^3$ and project forward and also rest upon the locking levers F. Therefore by depressing either of the initial keys C' $C^2$ $C^3$ the lifting rod K is lifted, the pawl G' raised and the drawer G thrown open. The same movement of the initial key lifts the rod M and operates the lever M' and the raising of the lever M' lifts the rod N and the pawl $n'$ and releases the levers D and D'.

It will be evident that the depressing of the calculating keys C has no effect on the lifting rod K inasmuch as the pins $m^3$ $m^4$ $m^5$ move through the slots $k^4$ therein. But if either initial key C' C² C³ be depressed the lifting rods K, M, or N are all lifted and so allow the mechanical operation of the machine to be performed. On the other hand should any one of the calculating keys C be depressed then by means of the levers F and the pins $m^3$ $m^4$ and $m^5$ the lever M' is lifted first taking the pawl $m'$ out of the rack M² and then the pawl $n'$ out of engagement with the ends of the levers D and D' thereby allowing the levers D to operate or move forward against the shoulder $c$ of the key C which may have been depressed.

The resetting lever D² is operated in one direction by the spring 6 and in the other direction by the lever $g^4$. Lever $g^4$ is pivoted to and moves with the cash drawer G. On the closing of the drawer $g$ the pivoted lever $g^4$ comes into contact with the resetting lever D² and operates same until the tail of the pivoted lever $g^4$ comes into contact with a fixed stop $g^5$. This fixed stop $g^5$ takes pivoted lever $g^4$ out of contact with resetting lever D². It is necessary to disengage the pivoted lever $g^4$ and thereby the cash drawer $g$ from the resetting lever D² in order to allow further depression of keys and operation of the various mechanism. This further depression of keys etc. takes place before the cash drawer is again opened and it will be apparent that if the resetting lever D² were not disengaged from the cash drawer $g$, the lever D would not be capable of further movement as they would be held by resetting lever D². This is accomplished by the locking lever F (lifted by key C not freeing lever D until key C is fully depressed.

During the operation of closing the cash drawer G the lever $g^4$ carries the resetting lever D² slightly beyond the position shown in Fig. 2, and while so carried beyond the pawl $n'$ is permitted to fall into the notches at the end of levers D and D' and the pawl $n'$ takes all the strain of the weights and springs attached to the levers D and D'. The pawl $m'$ on the resettinglever D² is also carried beyond the rack M² and therefore has time to fall into position to engage with the first tooth of the rack. The rack M² has therefore only to sustain the pressure of the springs 6 and 7. The resetting lever D² as described actuates the swinging frame 110 by means of lever H and link $h'$. The resetting lever D² being disengaged from the cash drawer $g$ is held by the retaining pawl $m'$ and rack M². So long as the retaining pawl $m'$ engages in rack M² the swinging frame will be in its forward position (off crosshead pins $b$). But on the resetting lever D² being released from contact with rack M² the spring 6 (Fig. 2) will carry the resetting lever to its up position taking with it the swing frame 110 and placing the counting plate A on to the crosshead pins $b$. This action is performed by any key being depressed the lifting lever M' so disengaging the pawl $m'$ from the pinion rack M². Time is allowed for the operation of the spring 6 to place the swinging frame 110 on to the pins $b$ of the crossheads B before any of the levers D start to move.

On the pivot of the hook $k$ on the lifting rod K a hanging weighted lever L is pivoted (see Figs. 23, 25 and 26), which extends below the pawl G' and against the hooks $k$ and $m$. The object of the weighted lever L is to insure the disengaging of the hooks $k$ and $m$ respectively from the pawl G' and the lever M' on the closing of the cash drawer G. As the drawer opens the weighted lever L is drawn back into the position shown in Fig. 25 by contact with a block $l$ on the edge of the drawer. As the drawer closes the block $l$ carries the lever L back in the reverse direction until it strikes the hooks $k$ and $m$ causing them to quickly disengage from the pins on the pawl G' and on the lever M' permitting them quickly to resume their normal position.

A bell P is operated by a bell hammer $p$ carried by a horizontally sliding rod P'. The rod P' is set to rest while in normal position with one end against the vertically lifting rod K so that when the vertical rod K is raised the horizontal rod P' is free to slide forward under it. The rod at its other end is fitted with a projecting arm $p^2$ which in normal position is behind the ends $d^6$ of the levers D. It is moved in one direction by a spring 7 and is carried back in the opposite direction by the resetting lever D² by means of a pin $p'$ which engages therewith. The horizontal rod P' when in the position shown in Figs. 23 and 24 allows the end of any of the levers D to be raised clear of the arm $p^2$. When however, the horizontal rod P' is moved forward the arm $p^2$ passes over the tops of the ends $d^6$ of the levers D and locks them thereby preventing either of them being operated during the time the drawer G is open. This provides that any key or set of keys C that has not been operated before one of the initial keys C' C² or C³ and before the drawer has been released and opened thereby shall be inoperative or have no effect on the lever D until the drawer G has again been fully closed.

Indicators R may be provided at the back of the machine to indicate the monetary values of the keys C which have been depressed. The machine illustrated indicates a striking down capacity of £9.19.11½ and this amount or any less amount can be displayed by the indicators R. The indicators comprise three disks R inscribed with the numerals and two vertically sliding plates R' and R² the plate R' for the tens of shillings and the plate R² for halfpenny as there is only one numeral to be displayed. There is also a disk or quadrant R³ with initial letters A, B, C, corresponding with the initial letters on the initial keys C', C², C³. On the axle $r$ of each disk R a pinion $r'$ is mounted with which gears a vertically sliding rack $r^2$. Each rack $r^2$ carries a laterally projecting arm $r^3$, above each end $d^6$ of the levers D a vertically sliding plate $r^4$ is placed upon which the free end of the arm $r^3$ rests. On the operation of either lever D the end $d^6$ is elevated and the plate $r^4$ raised a corresponding distance and with it the arm $r^3$ and rack $r^2$ thereby rotating the disk R a corresponding extent and displaying a numeral through a slot $r^5$ corresponding with the value of the key C which has been struck. The vertically sliding plate R' representing tens of shillings is connected by an arm $r^5$ with a vertically sliding plate $r^6$ and is raised the desired distance by it. And the vertically sliding plate R² representing a half-penny is connected by the arm $r^7$ with the plate $r^8$ and is raised the desired distance by it. The quadrant R³ is also provided with a pinion and is connected with a vertically sliding plate $r^9$ by a quadrant arm $r^{10}$. The plate $r^9$ is raised by the end of lever D' connected with and operated by one of the initial keys C' C² or C³, (see Figs. 10 to 13). The disks R are provided with numerals back and front so as to expose and display the same numbers both to the back and front of the machine.

Each of the plates $r^4$ $r^6$ $r^8$ and $r^9$ are provided with a number of holes and in front of them is a swinging bar S with a number of pins $s$ which enter the holes in the plates to lock the plates and the indicators R in any desired position. The swinging bar S moves horizontally, is pivoted at one end and at the other engages a second swinging lever S' by which it is moved to and from the plates $r^4$, $r^6$ $r^8$ and $r^9$. The second swinging lever S' connects at its lower end with the resetting lever D² by means of a pin $s'$.

The indicators R are held in the position to display the figures by the ends $d^6$ of levers D so long as the levers D remain depressed. As soon as the resetting lever D² is moved by the closing action of the drawer G to reset the levers D it also moves the two swinging levers S' and S and brings the pins $s$ into the holes of the indicator plates $r^4$ $r^6$ $r^8$ and locks them thereby holding the indicators exposed until the resetting lever D² is released by the lifting of the lever M' and pawl $m'$ from the locking rack M². On this movement of the resetting lever D² the plates and indicators R return to zero or fall onto the end $d^6$ of the levers D.

For the purpose of printing and recording every transaction of the machine as operated by the keys C each lever D is provided with a quadrant upon which is mounted a type block T carrying numerals corresponding to the numerals on the keys C. Above the type block T a pressure pad T' is placed carried on a pivoted arm or lever T² so that it may be rocked down upon the type block. The pressure pad T' always moves in the same path or plane and consequently will when depressed strike whichever numeral is presented to it according to the position of the type block T on the lever D.

Around the pressure pad T' is carried a ribbon of paper $t$ which travels forward at each operation of the machine from the roller $t'$ to the roller $t^2$. Between the pressure pad T' and the type block T a ribbon U saturated with printing ink or coated with carbon is caused to travel by which the impress of the numerals on the printing block T is imparted to the paper $t$. The depression of any key C carries the type block T into such a position that the corresponding numeral thereon is presented beneath the pressure pad T'. The rocking lever T² which operates the pressure pad is rocked by a pin $t^4$ on the end of the resetting lever D² striking a trip cam $t^5$ thereon. The trip cam $t^5$ is capable of adjustment to regulate the amount of pressure applied by the pressure pad to the printing paper. In its upward movement the resetting lever D² has no effect on the printing lever T² by reason of the trip cam $t^5$ but as the lever D² descends when the drawer G is closing the pin $t^4$ engages the trip cam $t^5$ and rocks the lever T² thereby causing the pressure pad T' to strike the type block T. The resetting lever acts upon the rocking lever T² and allows it to return to normal position before acting upon or resetting any of the levers D. That is to say, the impression of the type has been taken and the pressure pad carried away from the type before the type shall have been disturbed. The paper winding roller $t^2$ is operated by a pawl $t^6$ connected to the swinging frame 110 which engages a ratchet wheel $t^7$ on the spindle of the roller. The pawl $t^6$ is mounted upon a sliding bar $t^8$ and the sliding bar is moved backward and forward by the frame 110 engaging two projecting pins thereon $t^9$. The paper winding roller $t^2$ is thus fed on the distance of one tooth of the ratchet wheel every time the drawer is closed.

The printing ribbon U is carried over a roller U' at one side of the machine and over a pin $u$ at the other side being arranged in an endless band and placed transversely of the paper ribbon $t^2$ see Figs. 9 and 21. A ratchet wheel $u'$ is placed on the shaft of the feed roller $U'$ with a pawl $u^2$ pivoted on a sliding plate $u^3$ by which it is actuated. A bell crank lever $U^4$ is pivoted between the sliding plate $u^3$ and the swinging frame 110 one arm of the lever engaging the plate and the other end the frame 110. Thus as the frame 110 moves to and fro the bell crank lever $U^4$ is rocked and the pawl $u^3$ causes the feed roller $U'$ to rotate and move forward the printing ribbon $U$ on the forward movement of the frame 110 when the cash drawer $G$ is closed. The feed roller $U'$ is mounted upon an adjustable frame $u^5$ which can be moved around a pin $u^6$ secured by a bolt $u^7$ in a radial slot to present a fresh track of the ribbon $U$ over the type block $T$. Or it may be adjusted longitudinally and secured by bolts $u^8$ to tighten the printing ribbon. The lever $D'$ also carries a type block $T^4$ with letters corresponding to the initial letters on the initial keys $C'$ $C^2$ $C^3$ and when one key is depressed the lever is released by the lifting of the pawl $m'$ and falls forward to bring the corresponding letter under the pressure pad $T'$. The distance it falls is regulated by the length of the slots $c^5$ which engage the pins $c^6$ on the ends of the keys. Slots $c^7$ in the lever also engage the pins $c^6$ when the lever $D^2$ has moved forward and lock the keys and thereby prevent more than one key being depressed. The lever $D'$ is moved in one direction by the spring $c^8$ and in the opposite direction by the resetting lever $D^2$.

What we claim as our invention and desire to protect by Letters Patent is:—

1. In calculating apparatus the combination with the operating keys $C$, of rocking levers $D$ oscillated when a key is struck, crossheads $B$ raised by the levers, the calculating plates $A$ $A'$ operated by the cross heads $B$, and means for locking the keys substantially as described.

2. In calculating apparatus the combination with the operating keys $C$, of rocking levers $D$ oscillated when a key is struck, crossheads $B$ raised by the levers, the calculating plates $A$ $A'$ operated by the crossheads $B$, and locking levers $F$ pivoted at the sides of the keys provided with, cross rails $o$ which rest upon the top of the keys and lock them substantially as described.

3. In calculating apparatus the combination with the operating keys $C$, of rocking levers $D$ oscillated when a key is struck, crossheads $B$ raised by the levers, the calculating plates $A$ $A'$ operated by the crossheads $B$, a cash drawer $G$, means for releasing the drawer, and a resetting lever $D^2$ which brings all the levers $D^2$ resting upon the levers $D$ back to zero, substantially as described.

4. In calculating apparatus the combination with the operating keys $C$, of rocking levers $D$ oscillated when a key is struck, crossheads $B$ raised by the levers, the calculating plates $A$ $A'$ operated by the crossheads $B$, a cash drawer $G$, a pawl $G'$ to hold the drawer, a rod $K$, capable of being raised a hook $k$ pivoted near its lower end, and means for raising the rod $K$ substantially as described.

5. In calculating apparatus the combination with the operating keys $C$, of rocking levers $D$ oscillated when a key is struck, crossheads $B$ raised by the levers, the calculating plates $A$ $A'$ operated by the crossheads $B$, a cash drawer $G$ placed below the rocking levers $D$ means for holding and releasing the drawer, and the rod $M$ placed at one side of the keys capable of being lifted, means for raising the rod, a hook $m$ pivoted thereto, a lever $M'$ with which the hook engages, extending along the side of the machine, a resetting lever $D^2$, a pawl $m'$ pivoted thereto and depending therefrom, and a fixed rack $M^2$ with which the pawl engages substantially as described.

6. In calculating apparatus the combination with the operating keys $C$, of rocking levers $D$ oscillated when a key is struck, crossheads $B$ raised by the levers, the calculating plates $A$ $A'$ operated by the crossheads $B$, a cash drawer $G$, means for holding and releasing the drawer, a rod $N$, capable of being raised, means for raising the rod, a pin $n$ thereon, a transverse lever $M'$ upon which the pin $n$ rests, and a locking pawl $n'$ engaging a notch in the arm of the rocking lever $D$ substantially as described.

7. In calculating apparatus the combination with the operating keys $C$, of rocking levers $D$ oscillated when a key is struck, crossheads $B$ raised by the levers, the calculating plates $A$ $A'$ operated by the crossheads $B$, a cash drawer $G$, means for holding the drawer, initial keys $C'$ $C^2$ $C^3$, lifting rods connected therewith to release the drawer, lateral projections $k'$ $k^2$ $k^3$ fitted to the rod $K$ to rest upon the initial keys, pins $m^3$ $m^4$ $m^5$ on the rod $M$ which project through the slots, $k^4$ in the rod $K$, and the locking lever $F$ which is raised thereby when one initial key is struck substantially as described.

8. In calculating apparatus the combination with the operating keys $C$, of rocking levers $D$ oscillated when a key is struck, crossheads $B$ raised by the levers, the calculating plates $A$ $A'$ operated by the crossheads $B$, a cash drawer $G$, the initial keys $C'$ $C^2$ $C^3$, means for retaining, releasing and opening the drawer, the disk indicators $R$, pinions $r'$ on axles of the disks, vertical sliding racks $r^2$ gearing with the pinions, arms attached to the racks, and vertically sliding plates attached thereto placed over the ends $d^6$ of the levers D by which the indicators R are operated.

9. In calculating apparatus the combination with the operating keys C, of rocking levers D oscillated when a key is struck, crossheads B raised by the levers, the calculating plates A A′ operated by the crossheads B, a cash drawer G, means for retaining, releasing and opening the drawer, means for displaying the monetary values of the keys, a type block T on the lever D, a pressure pad T′, a rocking lever $T^2$ carrying the pressure pad, and means for operating the lever $T^2$ substantially as described.

10. In calculating apparatus the combination with the operating keys C, of rocking levers D oscillated when a key is struck, crossheads B raised by the levers, the calculating plates A A′ operated by the crossheads B, a cash drawer G, means for retaining, releasing and opening the drawer, means for displaying the monetary values of the keys, a type block T on the lever D, a pressure pad T′, a rocking lever $T^2$ carrying the pressure pad, a pin $t^4$ on the rocking lever $D^2$, and a trip cam $t^5$ on the lever $T^2$ substantially as described.

11. In calculating apparatus the combination with the operating keys C, of rocking levers D oscillated when a key is struck, crossheads B raised by the levers, the calculating plates A A′ operated by the crossheads B, a cash drawer G, means for retaining, releasing and opening the drawer, and means for displaying the monetary values of the keys, a type block T on the lever D, a pressure pad T′, a rocking lever $T^2$ carrying the pressure pad, and means for carrying and traversing a ribbon of paper between the type block T and pressure pad T′ substantially as described.

12. In calculating apparatus the combination with the operating keys C, of rocking levers D oscillated when a key is struck, crossheads B raised by the levers, the calculating plates A A′ operated by the crossheads B, a cash drawer G, means for retaining, releasing and opening the drawer, means for displaying the monetary values of the keys, a type block T on the lever D, a pressure pad T′, a rocking lever $T^2$ carrying the pressure pad, the rollers $t′$ and $t^2$ upon which the paper is wound, a ratchet wheel $t^7$, a pawl $t^6$ to engage the ratchet wheel, and a sliding bar $t^8$ to which the pawl is pivoted substantially as described.

13. In calculating apparatus the combination with the operating keys C, of rocking levers D oscillated when a key is struck, crossheads B raised by the levers, the calculating plates A A′ operated by the crossheads B, a cash drawer G, means for retaining releasing and opening the drawer, means for displaying the monetary values of the keys, a type block T on the lever D, a pressure pad T′, a rocking lever $T^2$ carrying the pressure pad, means for carrying a ribbon of paper $t$ to receive the record, a saturated ribbon U to supply the printing medium, and means for traversing the ribbon U substantially as described.

14. In calculating apparatus the combination with the operating keys C, of rocking levers D oscillated when a key is struck, crossheads B raised by the levers, the calculating plates A A′ operated by the crossheads B, a cash drawer G, means for retaining releasing and opening the drawer, means for displaying the monetary values of the keys, a type block T on the lever D, a pressure pad T′, a rocking lever $T^2$ carrying the pressure pad, means for carrying a ribbon of paper $t$ to receive the record, a saturated ribbon U to supply the printing medium, a feed roller U′ and pin $u$ over which the ribbon U is extended, a ratchet wheel $u′$ on the feed roller, a pawl $u^2$ engaging the ratchet, a sliding plate $u^3$ upon which the pawl is pivoted, and means for reciprocating the plate substantially as described.

In witness whereof, we have hereunto signed our names in the presence of two subscribing witnesses.

BENJAMIN THOMPSON O'BRIEN.
WALTER HENRY BROWNING.

Witnesses:
 THOS. O'BRIEN,
 EDITH M. SIMS.